United States Patent [19]

Henderson

[11] 4,212,067
[45] Jul. 8, 1980

[54] NAVIGATING DEVICE

[75] Inventor: Claude L. Henderson, Indianapolis, Ind.

[73] Assignee: General Aviation Electronics, Inc., Indianapolis, Ind.

[21] Appl. No.: 926,544

[22] Filed: Jul. 20, 1978

[51] Int. Cl.$^2$ ............................................. G01S 11/00
[52] U.S. Cl. .................................... 364/460; 364/448; 343/112 R
[58] Field of Search ............... 364/448, 449, 443, 444, 364/451; 343/112 R, 112 C, 112 D, 112 TC

[56] References Cited

U.S. PATENT DOCUMENTS

| | | | |
|---|---|---|---|
| 3,750,942 | 8/1973 | Bean | 343/112 C X |
| 3,755,817 | 8/1973 | Wipff et al. | 364/444 X |
| 3,796,867 | 3/1974 | Abnett et al. | 343/112 C X |
| 3,821,523 | 6/1974 | Chisholm et al. | 364/460 |
| 3,962,644 | 6/1976 | Baker | 325/470 |
| 3,994,456 | 11/1976 | Post et al. | 364/448 X |
| 4,000,468 | 12/1976 | Brown et al. | 325/335 |
| 4,048,570 | 9/1977 | Sumi | 325/459 |
| 4,069,412 | 1/1978 | Foster et al. | 343/106 X |
| 4,086,632 | 4/1978 | Lions | 364/448 X |

Primary Examiner—Edward J. Wise
Attorney, Agent, or Firm—Gust, Irish, Jeffers & Rickert

[57] ABSTRACT

A keyboard entry VOR receiver incorporating a phase locked loop frequency synthesizer under processor control is disclosed. In one version a scanning VOR navigation receiver with a multitude of VOR displays operating from that one receiver and under the control of the processor also includes a keyboard for operator entry of information into the processor and a display for viewing frequency and other information during operation of the receiver. The processing means includes a central processing unit, keyboard and display interface circuitry, general input and output circuits and a memory. The display may be a conventional omni bearing selector and course deviation meter arrangement or a plurality of three digit bearing displays may be employed. In another version, an automatic area navigation system and incrementing VOR receiver includes the single radio frequency receiver which is selectively operable at each of a plurality of different receiving frequencies corresponding to different radio navigation facilities, as well as the processing arrangement which includes a central processing unit, keyboard and display interface circuitry, and a hierarchy of memories. These memories provide storage for the current 160 VOR frequencies along with their associated morse code identifiers. The longitude and latitude of each VOR station may also be stored in a read only memory. Display for the area navigation feature may include digital read outs for longitude and latitude of an operator selected way point along with a course deviation meter identifying an azimuth or radial for navigation. The radio navigation device includes a keyboard and a display for viewing frequency and bearing information. In the area navigation automatic mode, a way point coordinate in longitude and latitude is entered into the processor, and the processor selects VOR stations automatically, from which a way point bearing is computed, and presented to the display circuitry for navigation purposes.

31 Claims, 14 Drawing Figures

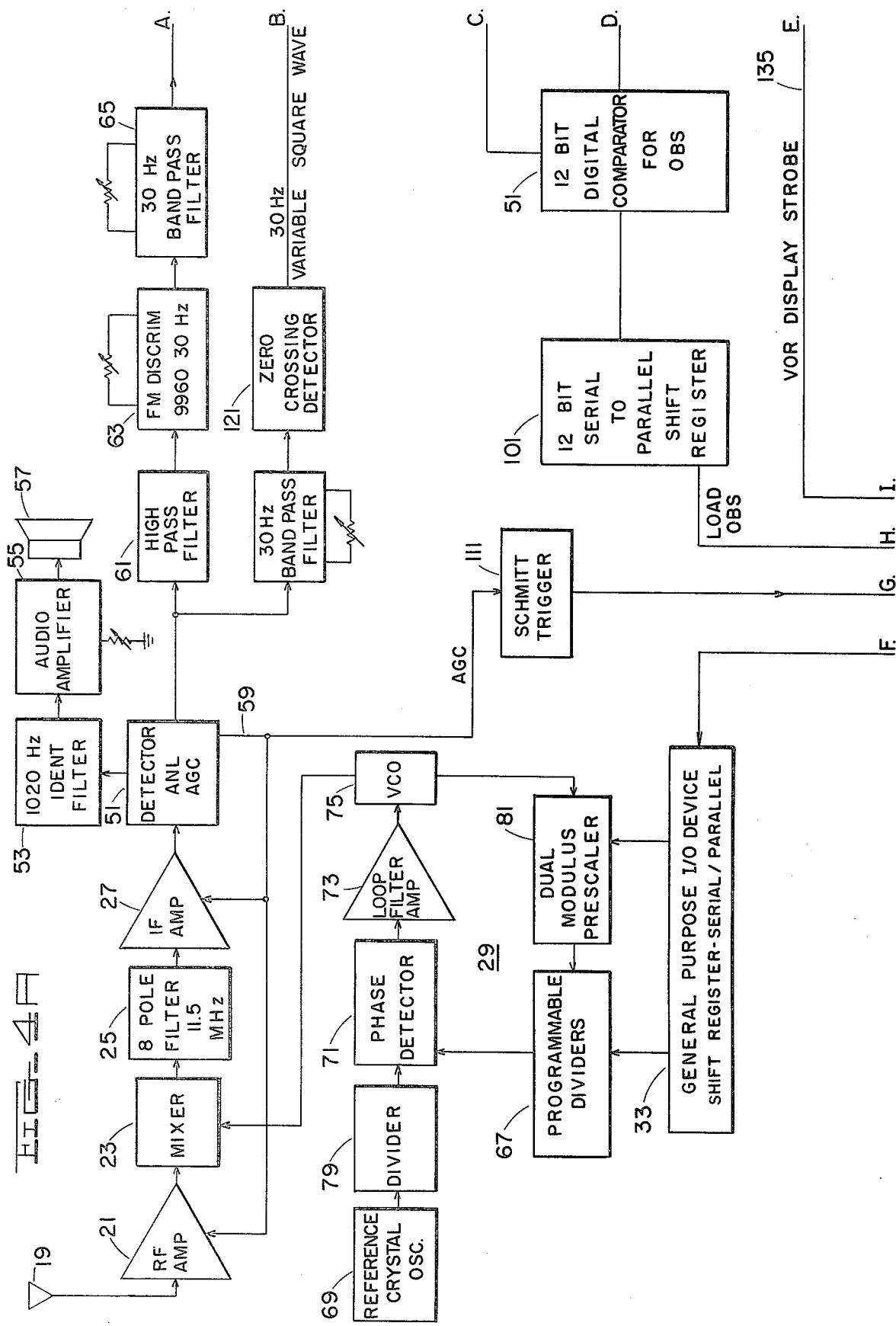

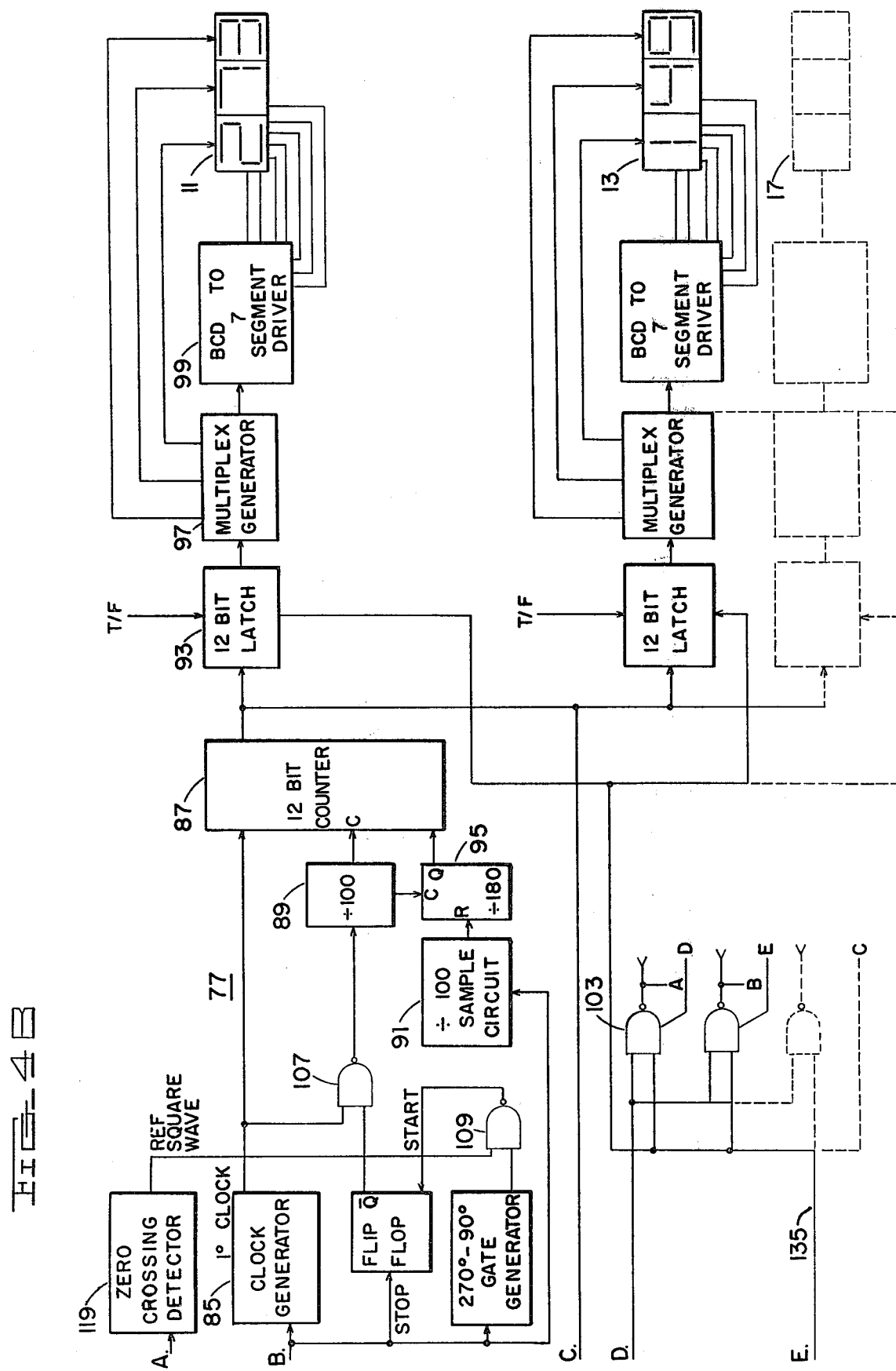

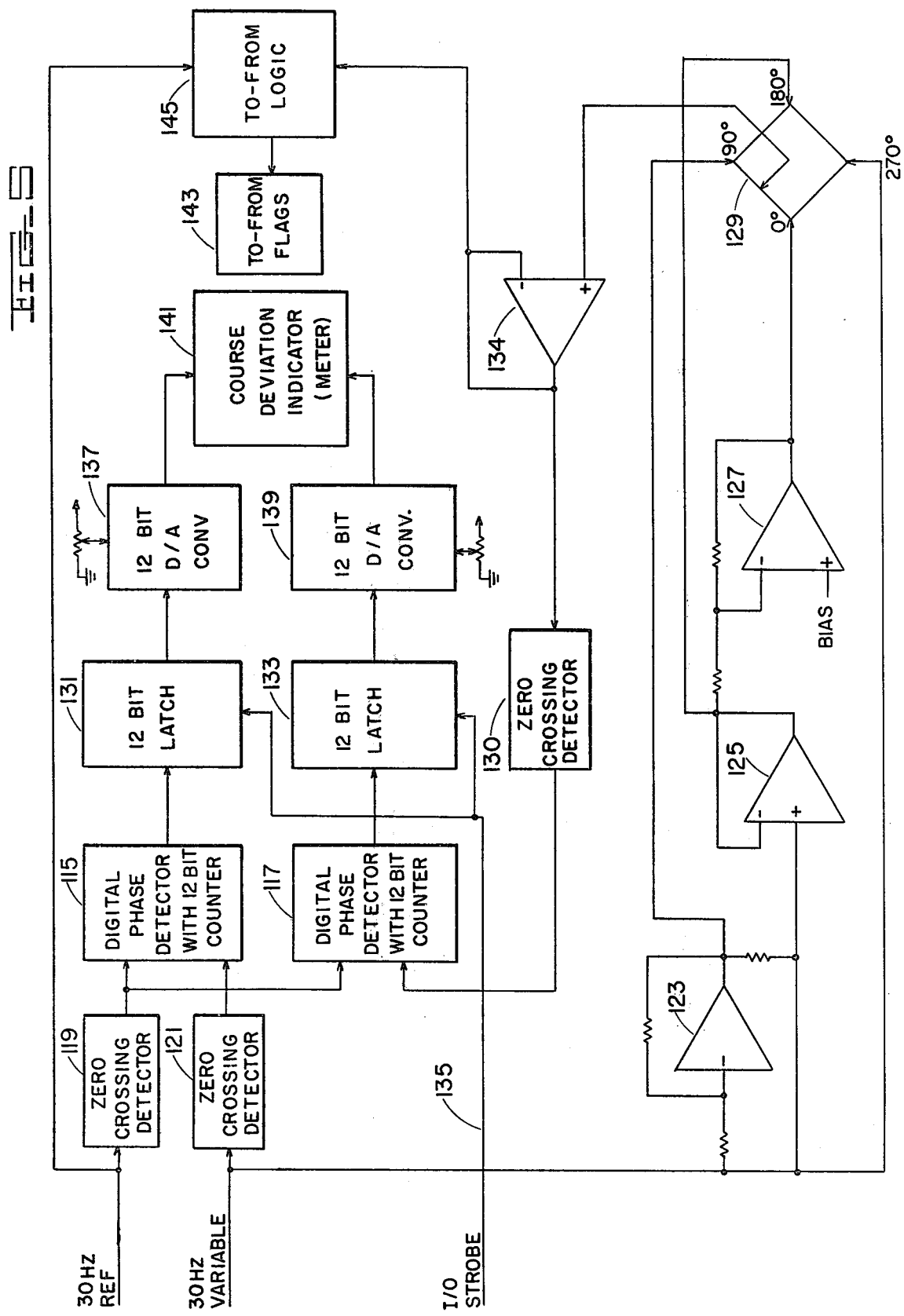

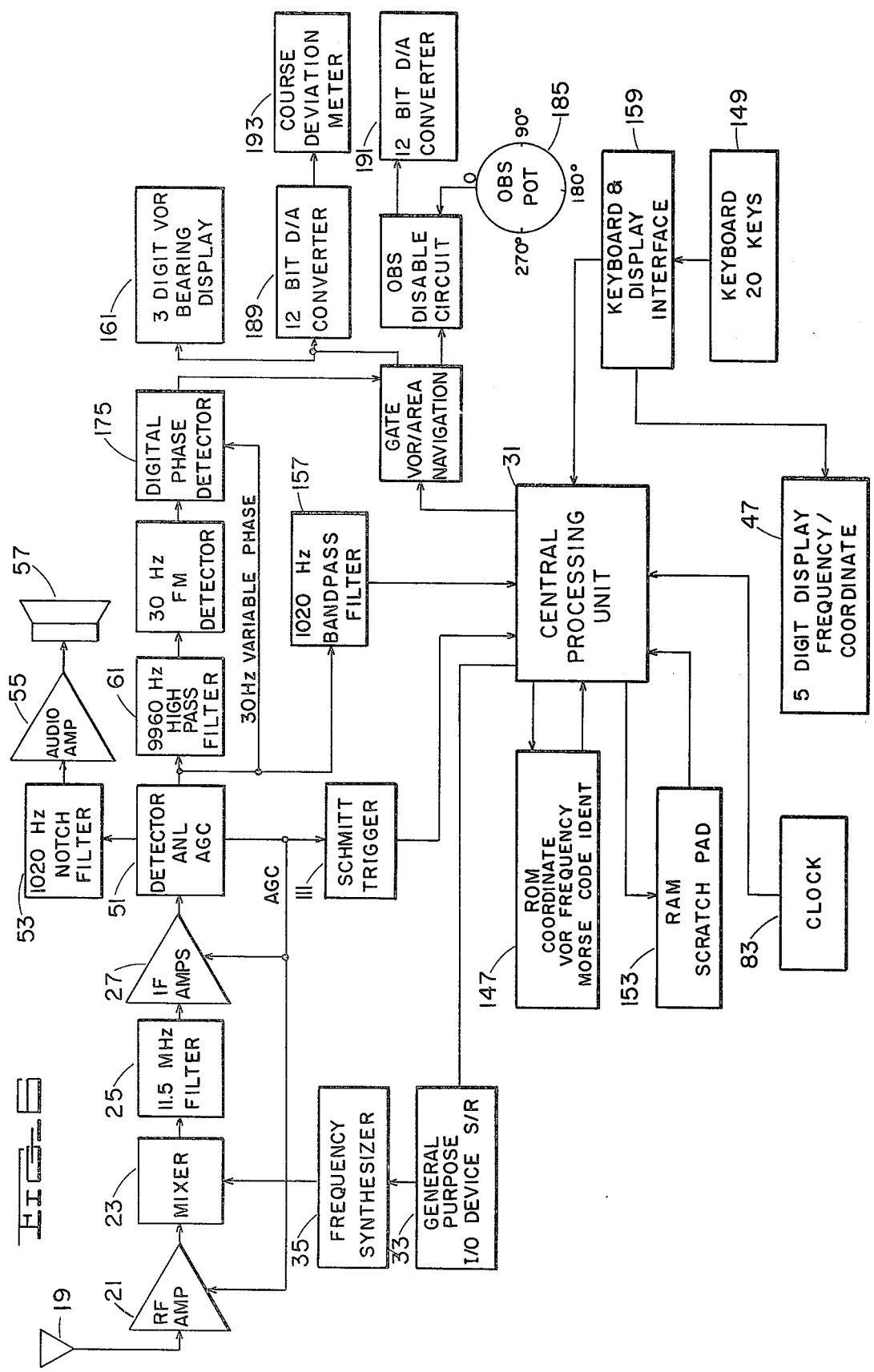

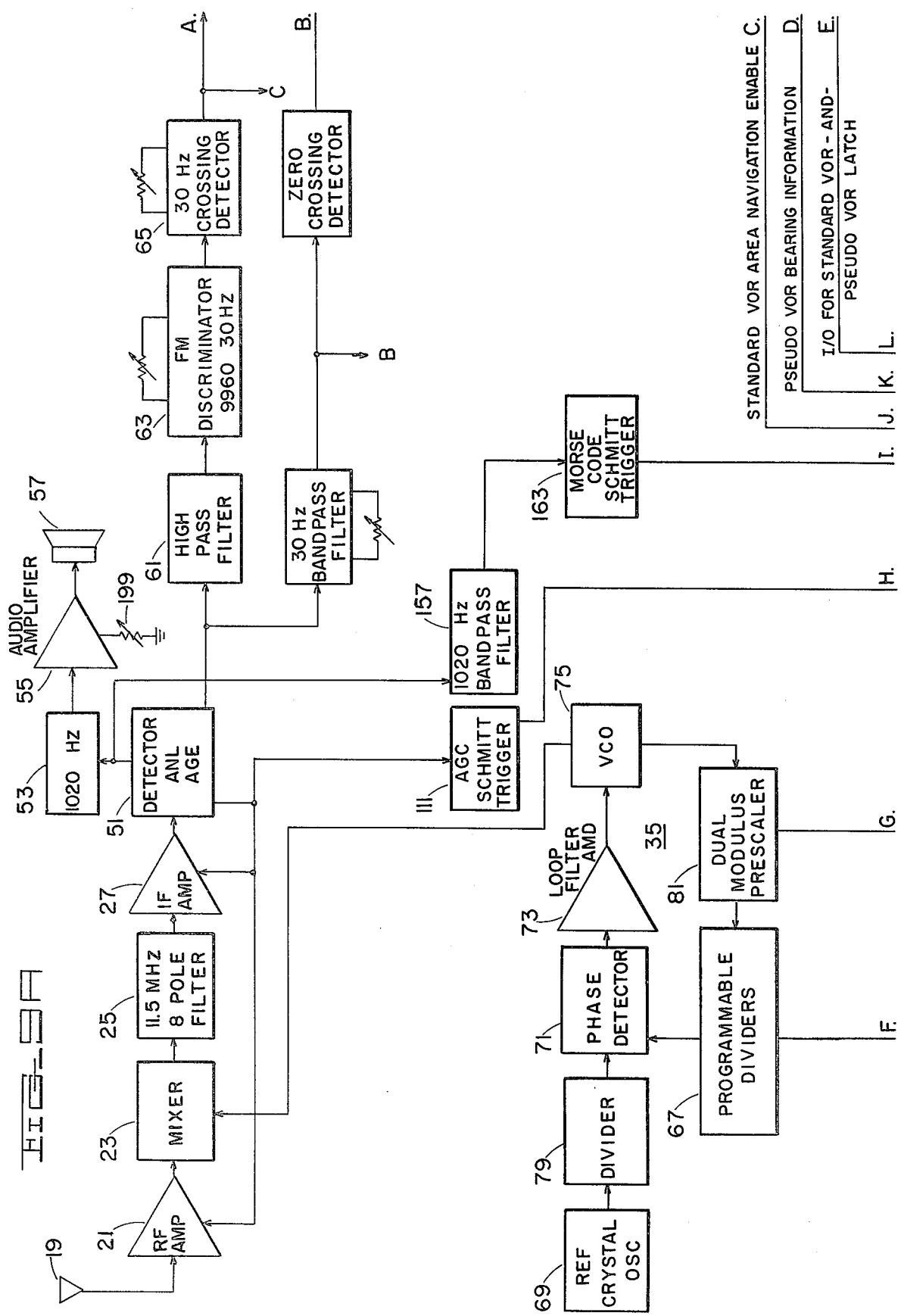

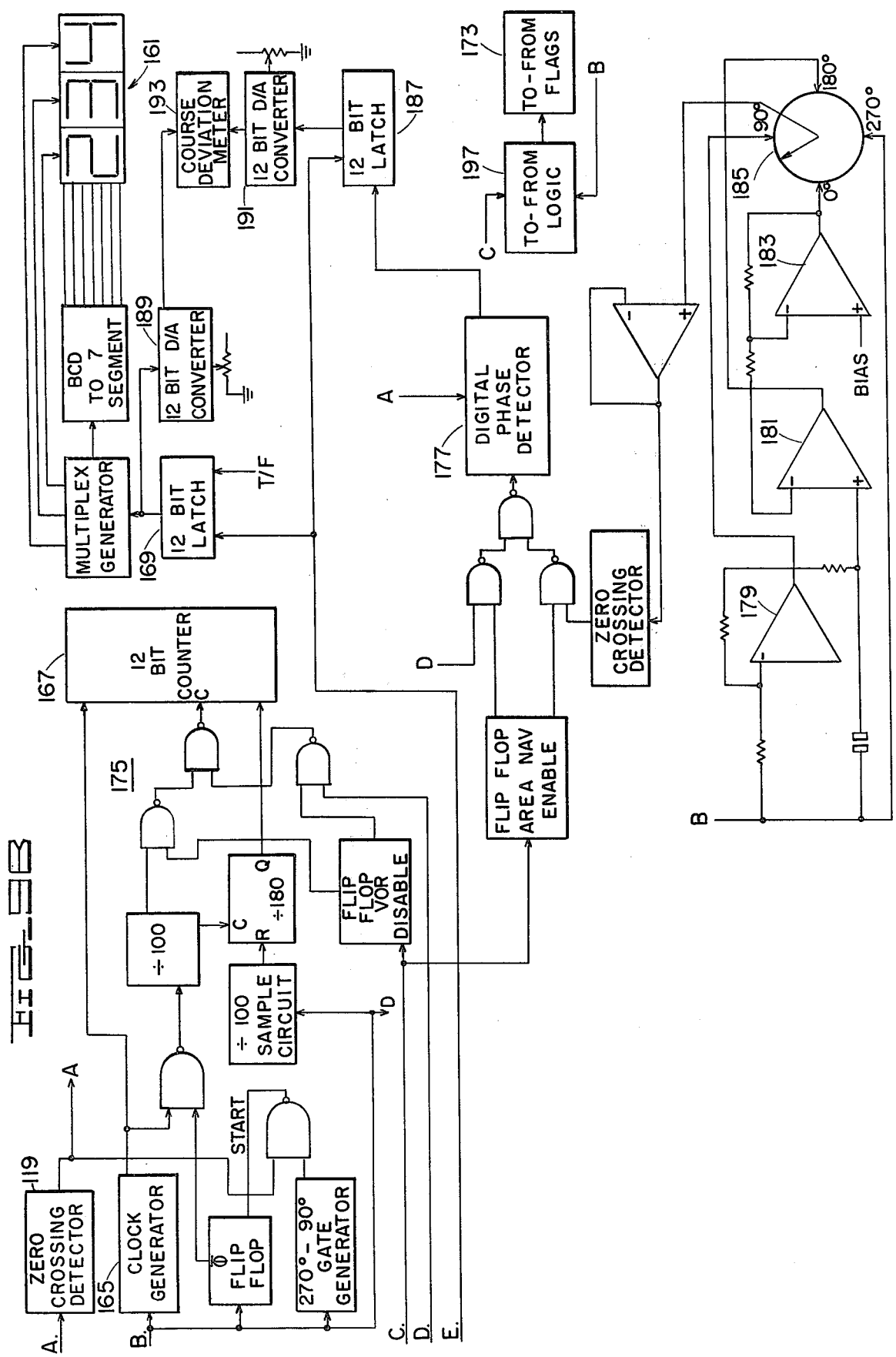

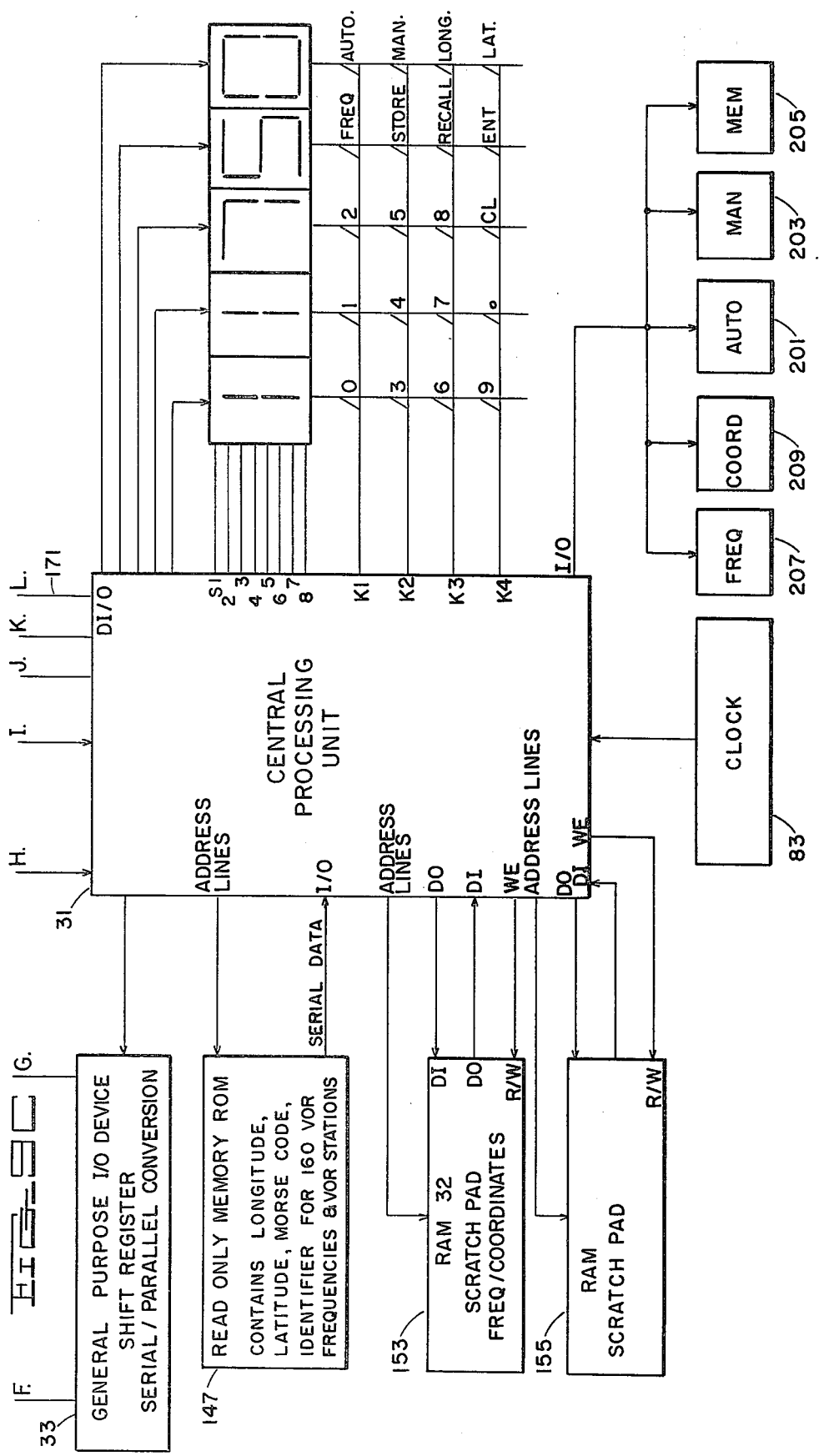

NAVIGATING DEVICE

BACKGROUND OF THE INVENTION

The present invention relates generally to electronic navigation devices and more particularly to a passive airborne radio navigation device, which automatically, and sequentially scans a plurality of VOR frequency channels, and simultaneously displays corresponding course bearing information on one or a plurality of digital indicators.

There is a vast body of knowledge relating to radio navigation devices including radio direction finders, radio ranges such as the four course radio range, VHF omni-directional range often in conjunction with a Tacan feature, as well as the several hyperbolic navigational systems such as the Loran system. While not limited thereto, the present invention finds particular utility in conjunction with the VHF omni-directional range commonly found in the Continental United States, and not requiring the distance measuring features sometimes associated with the VOR system.

Navigation VOR receivers capable of tuning the VOR frequency band between 108 and 118 megahertz are well known and are typically capable of tuning but a single channel at a time with each receiver including a single course deviation indicator and omni bearing selector display arrangement. In order to simultaneously monitor two or more VOR signals, the typical installation employs separate VOR receivers for each desired channel and the corresponding course bearing indicator for each receiver. Thus, a typical aircraft installation will include 2 independent VOR receivers which the pilot must periodically update during a cross-country flight.

Area navigation systems have become increasingly popular over the last several years. Such area navigation systems are typified by U.S. Pat. Nos. 3,750,942 and 4,069,412, and require a VOR receiver and a distance measuring equipment unit. Distance measuring equipment or DME is operable with only a fraction of the nationwide VOR navigational facility network and requires an airborne interrogator or transmitter and a ground based transponder which replies to interrogations from the airborne interrogator, returning pulses thereto for distance measuring purposes. In addition to being expensive and slow (often 20 seconds is required to determine an accurate distance from the aircraft to the navigational facility), such distance measuring equipment is not operable in conjunction with many of the VOR facilities which lack the transponder or Tacan capability. With the known area navigation systems, a way point omni bearing selector or OBS is used to set the proper bearing or azimuth and the DME feature provides a distance indication which may then be entered into a computation to determine a distance from a selected way point. Thus, in the prior art area navigation systems, an expensive and unreliable DME was used in conjunction with a one channel at a time VOR receiver to produce a desired way point. Such systems have been entirely manually operated requiring some time for the pilot to set up frequency and radial information to verify the proper identification of the VOR station, set up the distance measuring equipment, and then navigate to the desired way point. It is estimated that only two thirds of the VOR stations in the Continental United States provide the necessary DME information for such navigation.

SUMMARY OF THE INVENTION

Among the several objects of the present invention may be noted the provision of an improved VOR receiver with scanning capabilities and processor means for controlling a frequency synthesizer, course bearing display, and overall operation of the receiver; the provision of a radio navigation device including a memory capable of storing a plurality of VOR frequencies prior to a cross-country flight, thereby eliminating some of the workload for the pilot during the flight; the provision of an improved automatic area navigation system with automated incrementing of each of the 160 typically encountered VOR frequencies, as well as their associated morse code identifiers and longitude and latitude information, along with a processing arrangement utilizing the stored information in conjunction with received information for computing azimuth information relative to a point distant from any of the VOR installations; the provision of an area navigation system which selects automatically the appropriate VOR stations for navigating to an operator determined way point; the provision of an area navigation system wherein the way point can be selected by the operator by entering the longitude and latitude of a desired location; the provision of a navigation processor utilizing bearing information from two or three VOR stations to compute a radial from a desired way point intersection; and the provision of a passive airborne radio navigation device which provides a display indicative of the device location in relation to a geographical location distant from any received navigation facility. These as well as other objects and advantageous features of the present invention will be in part apparent and in part pointed out hereinafter.

In general and in one form of the invention a radio navigation device includes a plurality of display units for continuously providing visible bearing indications relative to a plurality of geographically separated radio navigation facilities in conjunction with a single radio frequency receiver which is selectively operable at each of a plurality of different receiving frequencies corresponding to different facilities along with a system for repetitively sequencing the receiver between different receiving frequencies at a rate sufficient to maintain a substantially continuously updated display for each bearing indication.

Also in general and in one form of the invention a radio navigation device employing but a single radio frequency receiver repetitively sequenced between different receiving frequencies includes a processing arrangement for received information from a number of different geographically separated navigation facilities to provide navigational data from a plurality of such facilities by way of the single receiver. In this form, the radio navigation device may either display bearing information relative to a distinct geographical location or may provide a visible or audible signal indicative of juxtaposition of the receiver location and one or more specified radials from specified VOR facilities.

Still further in general and in one form of the invention, a passive airborne radio navigation device includes an arrangement for receiving navigation signals from a plurality of geographically separated navigation installations along with an arrangement for combining the navigation information from those installations and for providing an indication of the airborne device location in relation to a geographical location distinct from any of the navigational facilities. As in the previous form, the information provided may be either an azimuth indication relative to an operator selected way point or information pertaining to the intersection by the aircraft with one or more specified VOR radials.

BRIEF DESCRIPTION OF THE DRAWING

FIG. 5 is a block diagram illustrating an alternate arrangement for a course bearing deviation indicator for the VOR receiver of FIGS. 1 through 4;

FIG. 6 is a block diagram of an automatic area navigation system employing an incrementing VOR receiver;

FIG. 9 (a-c) illustrates a detailed block diagram of the electrical circuitry for the area navigation system of FIGS. 6 through 8.

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENTS

Figure 1:
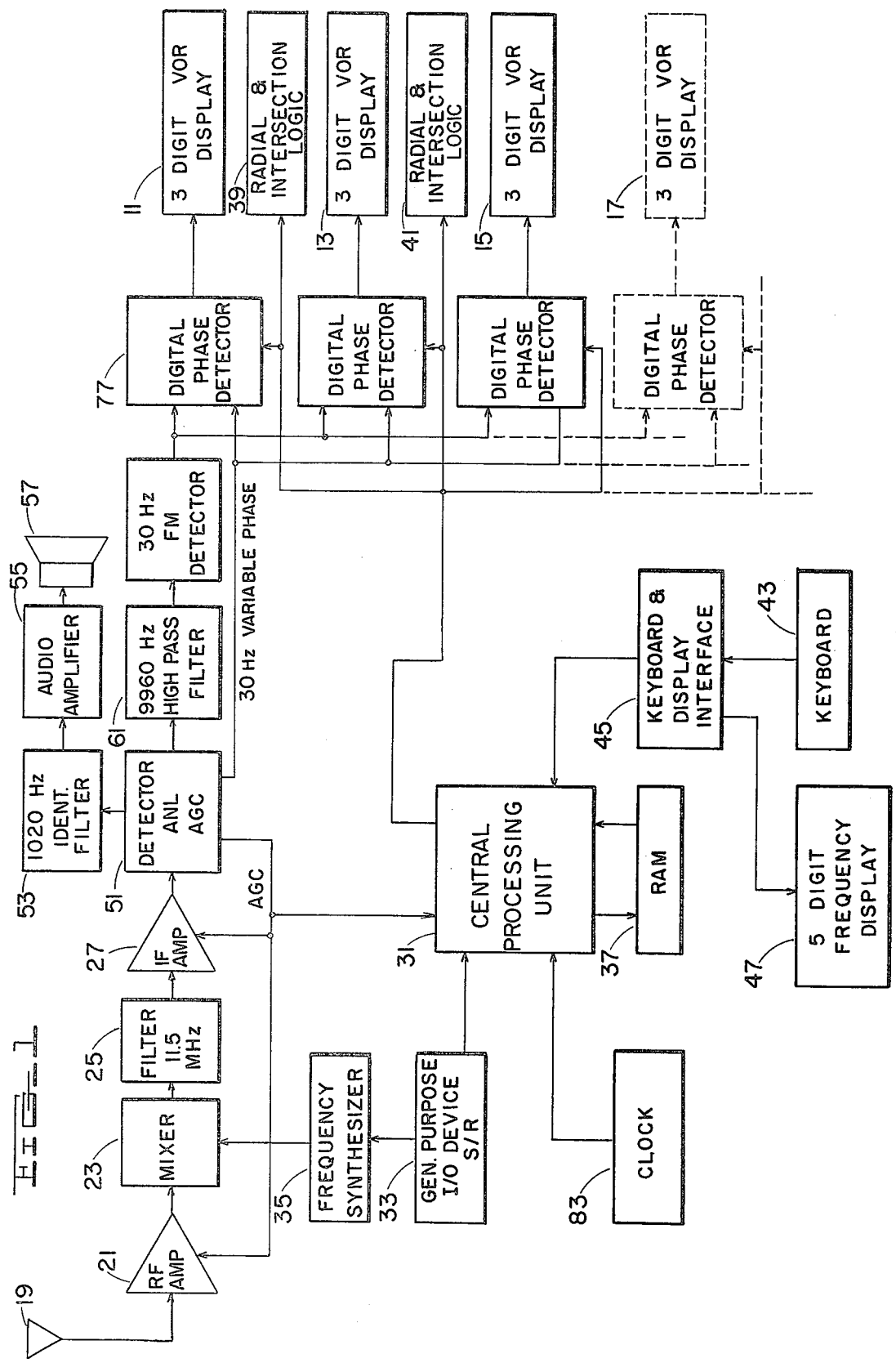
FIG. 1 is a block diagram illustrating the scanning VOR receiver embodying the present invention.

Referring now to the drawings in general and particularly to FIG. 1, the radio navigation device is seen to include a plurality of display units 11, 13, 15 and 17 for continuously providing simultaneous visible bearing indications relative to a plurality of geographically separated radio navigation facilities. A single radio frequency receiver having a receiving antenna 19, radio frequency amplifier 21, mixer 23, filter 25, intermediate frequency amplifier 27, and a phased locked loop arrangement 29 for determining the particular frequency to be received is operable at each of a plurality of different receiving frequencies corresponding to different radio navigation facilities. The receiver is repetitively sequenced between different frequencies by the differing values supplied by a central processing unit 31 via the input output device 33 to the frequency synthesizer 35 and the rate of sequencing is sufficient to maintain a substantially continuously updated display for each bearing indication. A plurality of digital indications corresponding to the different receiving frequencies are stored in the random access memory 37. These digital indications are supplied to a programmable divider within the phase locked loop to determine the frequency output from the frequency synthesizer 35. The random access memory 37 may further store a plurality of preselected bearing indications along with the associated facility frequency and radial, and intersection logic circuitry 39 and 41 may enable output indications when a stored and a received bearing are equal. The radial and intersection logic 39 or 41 may further provide an additional indication when at least two distinct facilities both have equal compared indications.

A manual input keyboard 43 and associated interface circuitry 45 interconnecting the keyboard 43, central processing unit 31, and a five digit frequency display 47, enables an operator to confirm entry of desired data. The keyboard 43 may include operator actuable means for categorizing entered data as being either bearing information or facility frequency information with either being displayed on the display unit 47 at the time of entry.

Broadly stated, the scanning VOR navigation receiver embodying the present invention is adapted to operate in several operational modes and has substantial flexibility in its operation due to a number of unique features that are incorporated in its design. An operator can easily display and load a specific frequency that is to be used by actuating or pressing numerical keys on the keyboard in the proper order, including the decimal point and by pressing the appropriate function key. For example, assuming the pilot wishes to receive a VOR station on a frequency of 116.30 megahertz, he merely enters that number by pressing the numerical keys on the keyboard 43 and the numbers are displayed in the displays 47 as they are entered. After all significant digits of the frequency are entered, i.e., all 5 digits are entered for the example being described. The ENT key 49 is pressed which loads this frequency into one of the channels of the receiver. With respect to the entry of the significant digits, the trailing zeros need not be entered. Other frequencies may be similarly entered and loaded until the maximum capacity of the receiver is reached which is preferably 16 channels, although a lesser number of channels may be used.

Figure 2:
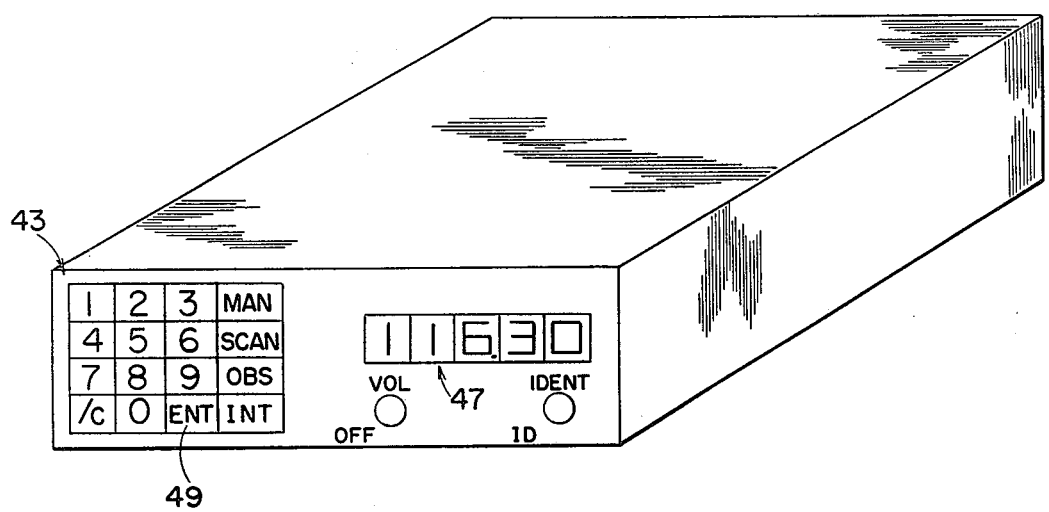
FIG. 2 is a view of the remote mounted VOR receiver.
Figure 3:
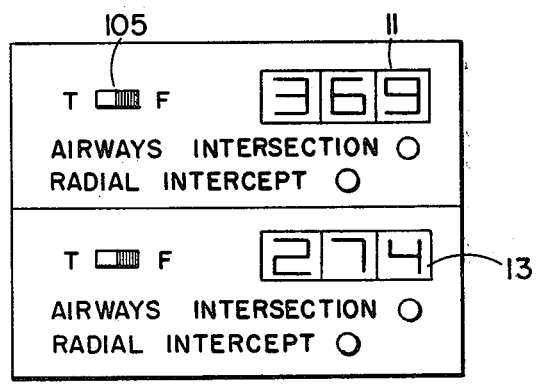
FIG. 3 is an illustration of a course bearing display unit accommodating two VOR stations.

Referring to the enlarged view of the keyboard 43 shown in FIG. 2, the following more detailed description of the operation of the VOR receiver of the present invention will be described in connection with the special function keys that are shown thereon. With respect to the keyboard as shown in FIG. 2, it comprises a total of 16 keys which are arranged in a 4 by 4 matrix and includes 10 numerical keys. Additionally keys which determine operational functions are also included, particularly an ENT key, a SCAN key, a MAN key, an OBS key, a INT key and a decimal point/CL key.

When the receiver is turned on, it automatically enters the SCAN mode wherein it sequentially scans or cycles through all channels that have been loaded with a frequency, at a rate of 1 channel every 2 seconds. When the MAN key is pressed, the scanning process is terminated and only the frequency of the corresponding channel is displayed. Additional closures of the MAN key will cause the receiver to move to the next channel so that the channels will be manually sequenced or any channel can be selected for the purpose of performing other functions regarding that channel. For example, should the pilot desire to change frequencies in a particular channel, when in the MAN mode of operation, one can merely press the keys for a new VOR frequency i.e. 113.7 megahertz. As soon as the keys are depressed, the new channel frequency is displayed in the 5 digit display 47. To place the frequency into memory 37 pressing the ENT key will enter the frequency 113.70 into memory for that channel. This process can be used for each channel by pressing MAN key to a new channel, key in the new frequency and the ENT, thus loading memory 37 with the desired number for that frequency. In the MAN mode, when the first numerical key is pressed, normal action of the MAN is terminated, the receiver goes into a data entry mode and the display 47 is blanked. Each number is then displayed as it is entered by the keyboard 43. When the operator is satisfied that the number entered is correct he may then load that frequency into the memory of the receiver by pressing the ENT key on the keyboard. Simultaneously with the frequency data loaded into memory, the receiver is also tuned to that frequency. If a VOR signal is sufficiently strong, an input to the processor from the AGC circuit 51 of the receiver enables the 3 digit bearing course display such as 11 to indicate the appropriate FROM radial of the VOR station.

Placing the receiver into the SCAN mode, allows the receiver to sequentially receive a multitude of preprogrammed VOR stations and display the bearing information of each station on a plurality of digital bearing information displays 11, 13, 15 and 17. A unique feature is also presented in the present invention. When the keyboard is placed into the MAN mode, pressing the OBS key allows one to enter the bearing of a particular radial FROM a station by way of the CPU 31 into a digital comparator 51 of FIG. 4. When the first numeral key is pressed, the normal action of the 3 digit bearing information is terminated and the 3 digit VOR display goes blank. Each number is displayed as it is entered by the keyboard 43. If the operator makes an error in entering the bearing information, pressing ./CL, will allow an incorrect bearing to be replaced by the correct display of bearing information. Pressing the ENT key while in the OBS mode will load the bearing into the comparator. Pressing either MAN or SCAN keys will activate the receiver to normal operation. When a VOR radial is intersected that corresponds with the digital comparator an audio or visual signal will be present alerting the pilot that he is on the preselected radial. The 3 digit display will show the received radial verifying that the proper radial is being intercepted.

A more complex feature requires the use of the INT key which is utilized to determine and indicate an airways intersection. Using the above procedure in the VOR mode, one can enter a frequency and corresponding VOR bearing of two VOR stations into two channels. After accomplishing this procedure, pressing the INT key then returns the receiver back into its normal scanning mode. When both the desired channels receive the preprogrammed radials into the digital comparator, then an audio or visual signal will alert the pilot to an airways intersection. An intersection is usually always defined by a primary FROM radial of one VOR and a secondary radial of an adjacent VOR to the airway.

The scanning VOR navigation receiver embodying the present invention will now be described in connection with the block diagram of FIG. 4 which illustrates the circuitry of the entire receiver. The receiver is adapted to receive all 160 VOR frequencies located between 108.0 and 117.95 megahertz. A frequency synthesizer 35 is utilized to generate the mixing signals that are applied to the RF mixer. Moreover, the frequency synthesizer as well as the selective switching of other components of the receiver are controlled by a microprocessor which will be more fully described hereinafter. Turning now to the drawing of FIG. 4, an electrical block diagram of the scanning VOR navigation receiver embodying the present invention is shown to include an antenna input 19 capable of supplying received signals to an RF amplifier 21 with a suitable bandwidth to adequately preselect the VOR navigation frequency of 108 to 117.95 megahertz. The output of the RF amplifier is connected to mixer 23. The output of the mixer 23 is an IF signal having a frequency of 11.5 megahertz which is applied to an 8 pole crystal filter 25. The filter utilizes a 3 db bandwidth of 35 kilohertz and a shape factor of 1.8:1 to reduce adjacent channel signals by approximately 70 db. The output of the IF crystal filter is amplified by additional amplifiers 27 to a suitable level for processing by envelope detector 51. The detector provides as an output, the composite VOR signal of 9960 hertz and 30 hertz and an audio output which is coupled through a 1020 hertz notch filter 53 and into an audio amplifier 55 which drives a 4 ohm speaker 57. The envelope detector also provides (AGC) automatic gain control voltages on line 59 to the RF amplifier and IF amplifiers to provide a constant output level of the VOR and audio signals. The composite VOR signal 9960 hertz is coupled through a high pass filter 61 and then demodulated by an FM discriminator 63 to produce a 30 hertz reference phase signal. The 30 hertz variable phase signal is supplied to a 30 hertz bandpass filter 65 to improve the signal to noise ratio of the received signal.

The frequency synthesizer 35 produces an output signal from 96.50 megahertz to 106.45 megahertz in 50 kilohertz steps to provide the IF output of 11.5 megahertz when mixed with signals from 108.00 to 117.95 megahertz. The frequency synthesizer is of generally conventional design and utilizes a programmable divider 67 within a phase locked loop 29. More specifically it comprises a crystal oscillator 69 which generates a standard reference frequency which is fed to a phase detector 71. The output of the phase detector is fed to an amplifier and filter 73 and to a voltage controlled oscillator (VCO) 75 which provides the output that is applied to the receiver mixer 23. The output of the VCO is also sampled by a programmable divider 67 which has a plurality of binary inputs, preferably that are controlled by the microprocessor 31 and connected to the general purpose input-output device 33. The input-output (I/O) device 33 loads the programmable divider 67 upon command with a number, and the voltage controlled oscillator 75 causes the divider to count down to a point at which the divider overflows. When the overflow occurs, and output is presented to the phase comparator 71 and also back to the divider itself which causes the general purpose input-output (I/O) device to reload the number again. The phase detector 71 compares the phase of the counter or programmable divider with the phase of the reference frequency and produces an output voltage that is proportional to the phase difference between the programmable divider and the reference frequency, which voltage is used as an error signal to control the voltage controlled oscillator frequency.

Depending upon the particular frequency and the capacity of the divider 67, the reference frequency may be reduced by a divider 79 and a similar divider or prescaler 81 may divide the output frequency from the voltage controlled oscillator to provide manageable numbers compatible with the capacity of the divider 67.

The microprocessor portion of the scanning VOR navigation receiver embodying the present invention includes the central processing unit (CPU) 31, clock 83, general purpose input-output device 33, memory 37 and a keyboard and display interface 45. Moreover, a compatible display and keyboard enable the pilot to program or load the receiver with frequencies of channels and view the display to obtain a visual indication of the programmed frequency.

Figure 4C:
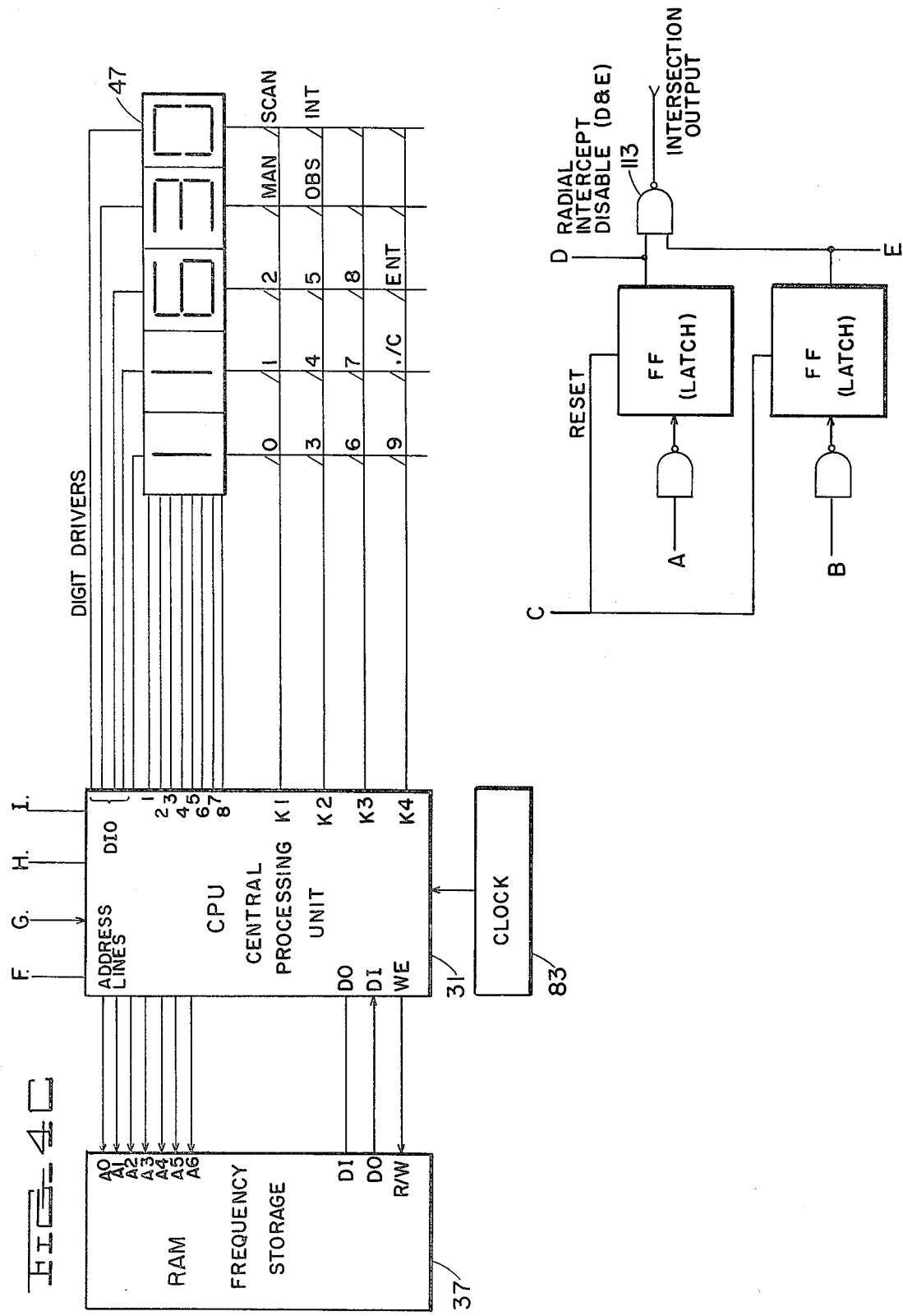
FIGS. 4 (a-c) illustrates a detailed block diagram of the scanning VOR receiver of FIGS. 1 through 3.

The block diagram of the keyboard and display interface is also shown in FIG. 4 with the central processing unit. A RAM (Random Access Memory) 37 is addressed by the input/output (I/O) from the central processing unit. The RAM can have written into its memory the VOR frequencies by binary addressing of the frequencies programmed by the keyboard 43. The CPU will also enable the read function of the RAM at the appropriate time with the output of the VOR frequency in serial binary form. The general purpose input/output device 33 converts the serial frequency data into parallel data to load the counters 67 and 81 of the frequency synthesizer simultaneously to reduce lock up times.

The central processing unit through its I/O ports both controls the receiver and the appropriate VOR displays 11, 13, 15 and 17 but also is controlled by the receiver, i.e., when the AGC voltage of the receiver on line 59 indicates that no signal is present on a particular frequency, the SCAN speed is increased by Schmitt trigger 111 to allow skipping over the empty channel and displaying only those channels that are active. The scan time on an active channel is about 2 seconds to permit proper operation of the VOR signal processing circuitry. The I/O ports also control the OBS and INT Functions as well as the multitude of VOR displays through multiplexed data.

The keyboard, display are well known techniques that do not require elaborate discussion at this point. The CPU multiplexes 5 digit driver outputs to activate the 5 digits. The CPU also multiplexes the 7 segments of each display with the 5 digit drivers. The keyboard selects through the appropriate digit driver and keyboard return $K_1$-$K_4$ the proper time slot to address the internal ROM of the CPU to perform the desired function, whether it is merely adding digits or a more complex feature as SCAN or OBS.

The VOR bearing information is read out in 3 digits giving an accuracy of ±1°. As previously mentioned there are two input signals required to properly operate the digital phase detectors 77 as shown in FIG. 4. The purpose of these circuits is to produce a three digit number in multiplexed format which is representative of the phase angle (in degrees) between the two square wave output signals of the analog radial circuits. The digital radial circuit output is fed to the display circuits. The basic operation of the circuit is such that a clock 85 signal, derived from the 30 hertz variable square wave generated by the analog section, is gated into a counter 87 for a period of time equal to the interval between the positive going edges of the reference and variable square waves. To minimize the effects of edge jitter, pulses are accumulated over 100 intervals thus producing a net count which represents an average value. To further improve resolution, the period of the clock pulses are equal to one degree. The net result is that at the end of 100 intervals, the number of pulses accumulated equals 100 times the phase angle between the reference and variable squarewaves. The gated pulses are therefore fed by way of a divide by 100 circuit 89. The output of that divider is then counted by the 12 bit counter 87. It can be seen that a phase angle value that jitters between 359° and 1° will produce an average value of 180°. To overcome this problem, a gate generator is included in the circuitry which is triggered by the negative going edge of the 30 hertz variable squarewave. The generated gate starts at 270° and terminates at 90° on the variable squarewave.

The net effect of the gate generator and the associated gate circuitry is to test and selectively shift the reference phase 180° if the phase angle between the two square waves falls below plus or minus 90° and hence approaches the zone of ambiguity where a substantial discontinuity occurs, i.e., 0°. By this technique, a phase angle of 359° is translated and made to look like (359−180)° or 179° which if it jitters or 181° produces no averaging problems. After the divide by 100 circuit 91 produces an output indicating that 100 samples of data have been taken, a gate opens allowing the pulses into the 12 bit counter 87 as well as the divide by 180 circuit 95. When the number of pulses reach 180, the divide by 180 circuit produces an output which in effect allows 180 pulses to be dumped into the counter. If during the 100 samples, 180 pulses are fed into the counter, it is reset to zero. The combined function of the gates 107 and 109 associated with the 100 samples accumulation period determines whether the 12 bit counter will be incremented by 180. The outputs of the counter 87 are fed into a latch such as 93 and strobed by the I/O of the processor in synchronism with the channel scanning but delayed sufficiently to allow lock up and the 100 sample times. The output of the latches such as 93 are fed into a multiplexer circuit 97 to derive the 3 digit strobe signals and the multiplexed 4 bit binary code. The 4 bit binary code is used in conjunction with a BCD to 7 segment decoder driver 99 to produce a a–g segments of the 3 digit display. The OBS feature is accomplished through the use of a digital comparator circuit 51. The output of the counter 87 can be fed into one input of a comparator. When a keyboard entry from OBS has been inserted, the I/O in serial form and in conjunction with a shift register 101 for serial to parallel conversion of data will load the preselected OBS bearing into the comparator input of the digital comparator. During operation as the aircraft passes the correct radial loaded into the digital comparator, the comparator gives a true output during coincidence of 12 bit data. This output by way of gates such as 103 can be used to alert the pilot by either visual or audio means.

When the processor has been activated into the INT mode, the same process occurs as mentioned previously except the I/O of the processor requires an AND function (gate 113) of the outputs of the comparator, one for each display, before providing an audio or visual presentation to the pilot. A plurality of the VOR displays can be used and are strobed in proper sequence by the processor to provide a multitude of VOR bearings while only using one VOR navigation receiver to accomplish the process, thus eliminating such wasted panel space, reducing cost and making the work load much easier for the pilot with more meaningful data. A TO-FROM switch 105 is provided by adding 180 pulses to the 12 bit counter on each display.

An alternate VOR display is shown in FIG. 5 which will provide course deviation indication in the more familiar type of operation in the present art. The 30 hertz reference and 30 hertz variable phase signals from zero crossing detectors 119 and 121 respectively from FIG. 4 are fed into two digital phase detectors 115 and 117. The phase detectors are identical to those shown in FIG. 4 and previously described in detail. The variable phase signal to one phase detector is coupled into a series of operational amplifiers 123, 125 and 127 to provide a quadrature voltage that is applied to an omni bearing selector potentiometer or OBS pot 129. The output of the OBS Potentiometer is a phase angle between 0° and 359° depending upon the pilot's selection. A rotatable compass card surrounding the course deviation meter is used to set the potentiometer and select the appropriate radial of the VOR station the pilot chooses to operate from.

The outputs of the digital phase detectors are coupled into 12 bit latches 131 and 133. The latches are strobed by the I/O line 135 of the processing unit in sequence with the selected channels. The output of the latches are fed into 12 bit digital to analog converters 137 and 139 to provide a D.C. output proportional to the binary value of the input code from the latches. The D/A converters will provide 11 bit accuracy and resolution thus giving accuracies of close to 0.5 degrees. The D.C. analog voltage is coupled into one side of the course deviation meter 141. When the proper radial has been intercepted as selected by the OBS, the phase angle information from both digital phase detectors 115 and 117 will be identical and hence the analog D.C. voltage from the D/A's will be equal thus resulting in a centered course deviation indicator.

A TO-FROM flag display 143 is possible through logic circuit 145 coupled to the reference and variable phases of the 30 hertz VOR signal. A plurality of these displays can be used with the scanning VOR navigation receiver. The I/O strobe signal to the 12 bit latches 131 and 133 will read the proper phase information into the latches simultaneously with the desired channel as it is being scanned. The rate at which the channels and displays are scanned is about 2 seconds per channel. The 2 second time is necessary to permit the digital phase detectors 115 and 117 to acquire 100 samples of the VOR phase information. The flight times and speeds of most aircraft are slow enough that the 2 seconds per channel should not be a factor during navigation.

FIGS. 6 through 10 relate to a modification of the navigation device as thus far discussed with respect to FIGS. 1 through 5, wherein substantially the same receiving circuitry and central processing unit are employed with enhanced storage capacity and somewhat more sophisticated software to provide an area navigation function.

Broadly stated the automatic area navigation system and VOR navigation receiver embodying the present invention as shown in FIGS. 6 through 10 is adapted to operate in several operational modes and has substantial flexibility in its operation due to a number of unique features that are incorporated in its design. The area navigation system features a read only memory or ROM 147 that has 16 K bit capability. Preprogrammed into the ROM are all of the VOR stations' frequencies, their exact geographical location in longitude and latitude to 1 minute accuracy and the corresponding morse code identification for each of the approximately 920 VOR stations nationwide. An operator can easily display and load the appropriate longitude and latitude of his destination by actuating or depressing numerical keys on the keyboard 149 in the proper order, including any decimal points and pressing the appropriate function key.

For example, assuming the pilot wishes to fly directly to an airport located at 85° and 34 minutes longitude and 41° and 26 minutes latitude, he merely enters the longitude numbers by pressing the numerical keys on the keyboard and the numbers are indicated in the displays 47 as they are entered. After all digits of the longitude are entered, i.e. 4 digits are entered for the example being described, the LONG key 151 is pressed which loads the longitude coordinate into random access memory 153. The latitude coordinate is then entered by the same procedure except the LAT key is pressed loading the latitude coordinate into memory. One minute resolution will provide accuracies of less than one mile.

Figure 7:
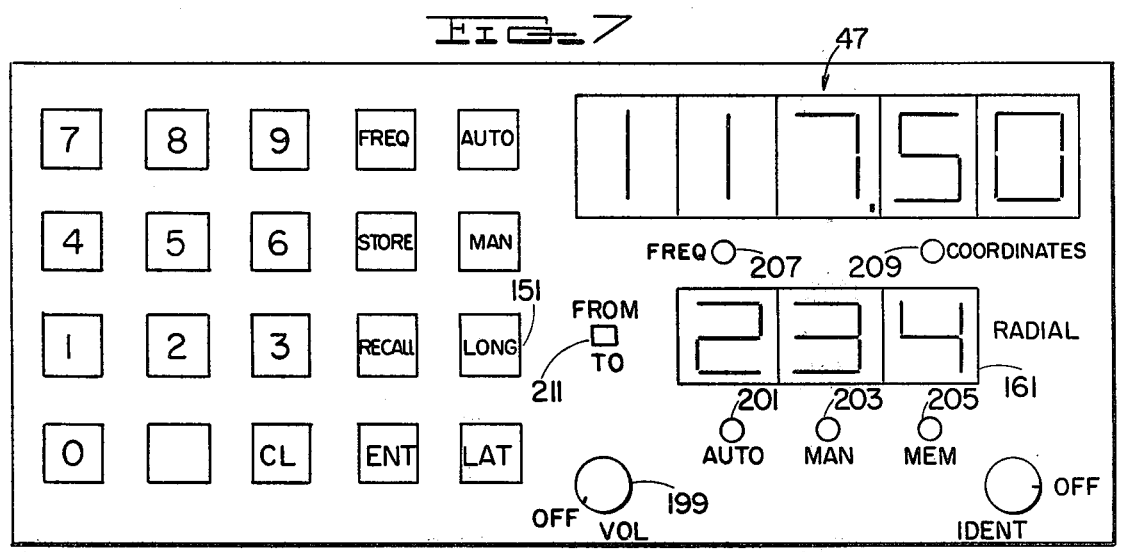
FIG. 7 is a view analagous to FIG. 2 but illustrating the area navigation receiver.

Referring to an enlarged view of the keyboard shown in FIG. 7, the following more detailed description of the automatic area navigation system of the present invention will be described in connection with special function keys that are shown thereon. With respect to the keyboard shown in FIG. 7, it comprises a total of 20 keys which are arranged in a 5×4 matrix and includes 10 numerical keys. Additional keys which determine operational functions are also included. Particularly, a FREQ key, a STORE key, a RECALL key, a LONG key, a LAT key, an ENT key, a decimal point, a CL key, AUTO key and MAN key.

When the area navigation receiver system is turned on, it automatically starts incrementing in 50 kilohertz steps through the 160 VOR frequencies that are stored in the read only memory 147. It will continue to increment until it has received a signal. The receiver and processor 31 will quickly identify the VOR station and retain in another memory 153 (called scratch pad) the frequency and coordinates as well as the FROM bearing of the VOR station. In about 5 seconds the receiver continues incrementing until 2 more received stations and their associated coordinates and bearing information is loaded into memory. The processor 31 will then compare the pertinent information associated with the 3 VOR stations and the longitude and latitude of the selected landing site, if previously entered, and compute the proper signal for the pilot to navigate his aircraft.

Figure 10:
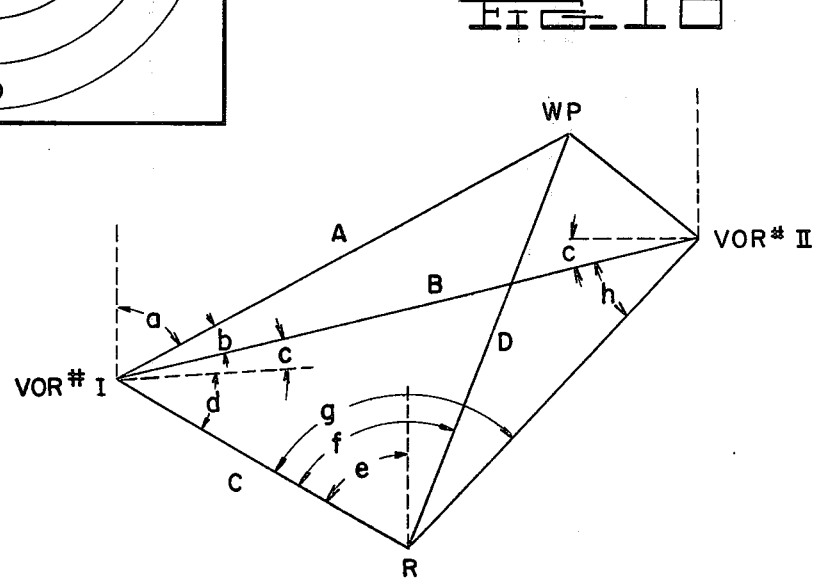
FIG. 10 is a diagram illustrating the parameters entering into a way point bearing computation.

As a simple example of the computation performed by the processor 31, the longitude and latitude of the two fixed ground transmitters, VOR #I and VOR #II of FIG. 10 are stored in the read only memory 147 on a permanent basis and the operator may enter the latitude and longitude of a desired way point WP into the random access memory 153. The distances A and B may then be computed by forming the square root of the sum of the squares of the appropriate coordinate differences. In a somewhat similar manner, the arc tangent of the appropriate ratio of coordinate differences may be calculated to determine the angles a and c. Angle b may then be determined by subtracting the sum of angles a and c from 90°. Angle d is next computed by subtracting from the radial from VOR #I, 90°, and in a somewhat similar manner the angle h is calculated by subtracting from 270°, the sum of angle c and the radial from VOR #II. The angle e is next determined by subtracting angle d from 90° C. Angle g is next determined by subtracting 180° from the bearing from VOR #II and then adding angle e. The distance C from the receiver R, which may for example be in the aircraft, is then calculated as the distance B times the ratio of the sine of angle h to the sine of angle g, according to the well known law of sines. The distance D from the receiver R to the way point WP may next be determined from the law of cosines as $$D=\sqrt{A^2+C^2-2AC\cos(b+c+d)}$$

Thereafter, angle f may be determined from the law of sines as the arc sine of the quantity A divided by D times the sine of the difference between the radial from VOR #1 and angle a. The radial from the way point is then simply 180° plus angle f minus angle e.

A third VOR ground navigation aid is paired with one of the VOR transmitters illustrated in FIG. 10 and similar calculations performed to resolve ambiguities such as the quadrant ambiguity involved in the arc sine or arc tangent calculations, as well as other possible ambiguities or errors as might occur for example if the receiver R happens to be disposed directly between the transmitters VOR #I and VOR #II on line B.

In determining the way point radial, the distance from that way point or pseudo VOR was also calculated. Since the processor frequently updates these calculations, the provision of an indication of elapsed time between updates will allow a calculation of ground speed as the difference between consecutively calculated values of D divided by the elapsed time between such calculations. Provision for displaying D and/or the ground speed may be incorporated into the system.

Returning to FIG. 7, when the MAN key is pressed, the automatic incrementing process is terminated and only the frequency of the last channel is displayed. Additional closures of the MAN key will cause the receiver to move or increment 50 kilohertz to the next VOR frequency. For example should the pilot desire to receive a particular channel, when in the MAN mode of operation, one can merely press the keys for a new VOR frequency, i.e., 115.80 megahertz. As soon as the keys are depressed, the frequency is displayed in the 5 digit display 47. To place the frequency into a scratch pad memory 153, pressing the ENT key will enter the frequency, 115.80 into memory. This process can be used for up to 32 frequencies, pressing MAN key to a new scratch pad location, key in the new frequency with the numeric keys and the ENT, thus loading memory with the desired number for that frequency.

In the MAN mode, when the first numerical key is pressed, normal action of the MAN mode is terminated, the receiver goes into the data entry mode and displays the frequency as it is entered by the keyboard. When the oeprator is satisfied that the number entered is correct, he may then load that frequency into memory by pressing ENT on the keyboard. Simultaneously with the frequency loaded into memory, the receiver is also tuned to that frequency. If a VOR signal is sufficiently strong enough, an input to the processor from the AGC circuit of the receiver enables the 3 digit bearing course display to indicate the appropriate FROM radial of the VOR station.

Figure 8:
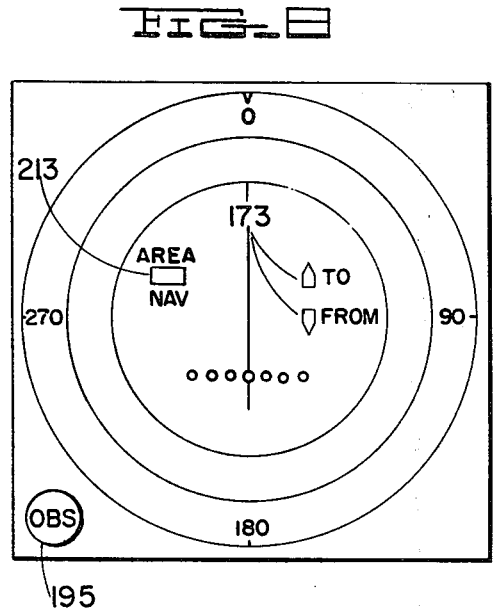
FIG. 8 is a view of a display unit and course deviation meter suitable for use with the automatic area navigation system of FIGS. 6 and 7.

Pressing the AUTO key places the processor and receiver into incrementing automatically through the 160 VOR frequencies that are stored in the read only memory (ROM). In the AUTO mode, the area navigation system is activated allowing the computation of the desired destination course and supplying information to the course deviation indication (FIG. 8).

The LONG key is used for programming into the processor memory the longitude of the desired destination or way point or even an intersection if one desires. The coordinates from a published list of airport geographical locations are entered into the processor in the following manner: when the LONG key is pressed, the processor and display are activated to receive the information and the display is blanked. Each number is then displayed as it is entered by the keyboard i.e., example 85 degrees and 34 minutes is entered by numerical key strokes of 85.34 and verified by the display as each digit is entered. Once the operator is satisfied with the coordinate, the ENT key is pressed placing the coordinates into memory 153.

The LAT key is used for programming into the processor memory the latitude of the desired destination way point or intersection one desires. When the LAT key is pressed the processor and display and keyboard function identically to the LONG key. When ENT key is pressed the LAT coordinate is placed into memory and simultaneously the processor will start incrementing and testing for VOR stations that can be used to compute a new radial for navigation to the way point. It is not necessary to press AUTO if the longitude and latitude are entered first. If one desired, the 3 VOR frequencies nearest the destination can be entered by the MAN key prior to entering the longitude and latitude information. If operated in this manner, after the latitude information is entered, the processor will automatically operate on the coordinates based on those 3 VOR stations and compute the proper radial to the destination or the proper radial to the destination way point without going into the incrementing sequence.

Another method of operation is when a longitude and latitude have been entered into the processor previously. In order to speed up the search for 3 VOR stations, a bracket of ±2° longitude and latitude is automatically applied to the desired destination coordinates. Now a very quick search of ROM 147 for VOR stations and their coordinates can be accomplished by looking only at their coordinates. The frequencies of all VOR stations that fall within the ±2° bracket will then be placed in the scratch pad memory. After the coordinate search process is completed, then the search commences with those VOR frequencies within that ±2° bracket. After 3 VOR stations are identified, tested for coordinate usefulness, the correct radial is then computed and routed to the display interface circuitry.

The STORE key function is used as an additional 4 level scratch pad memory 155 (FIG. 9) for retaining either longitude/latitude or frequency information useful during a cross country flight.

The recall key is utilized to recall or roll through the 4 levels of information in the STORE scratch pad 155. Each depression of the RECALL key will roll the 4 level stack one position. Thus 4 depressions reverts to the original information. A depression of ENT will remove the information that has been recalled and placed into processor for immediate use.

The FREQ key has a unique feature in that the incrementing frequencies will be displayed during the process of 50 kilohertz increments or any of 32 frequencies previously stored in memory. Once 3 VOR stations are obtained, the frequencies of each station as its information is being processed will be displayed. A second depression of the FREQ key will disable the frequency read out. A flashing or continuous changing display can be a distraction to a pilot and hence the reason for disabling the display when desired.

The decimal point key is utilized to place the decimal point in frequencies and coordinates. The CL key is useful if an operator makes an error in entering the frequency or coordinate, pressing the CL key will allow an incorrect entry to be cleared from the display and the correct information can be loaded with the numeric keys. The CL key can also be used to clear either of the scratch pad displays provided the MAN or STORE key is depressed prior to pressing the CL key.

The area navigation system and receiver embodying the present invention will now be described in connection with the block diagram of FIG. 9 which illustrates the circuitry of the entire receiver. The receiver is adapted to receive all 160 VOR frequencies located between 108.0 and 117.95 megahertz. A frequency synthesizer 35 is utilized to generate the mixing signals that are applied to the RF mixer 23. Moreover, the frequency synthesizer as well as the selective switching of other components of the receiver are controlled by a microprocessor which has been discussed and will be more fully described hereinafter. Turning now to the drawing of FIG. 9, an electrical block diagram of the automatic area navigation system embodying the present invention is shown to include an antenna input 19 capable of supplying received signals which are applied to an RF amplifier 21 with suitable bandwidth to adequately preselect the VOR navigation band of 108 to 117.95 megahertz. The output of the RF amplifier is connected to mixer 23. The output of the mixer is an IF signal having a frequency of 11.5 megahertz which is applied to an 8 pole crystal filter 25. The filter utilizes a 3 db bandwidth of 35 kilohertz and a shape factor of 1.8:1 to reduce adjacent channel signals by approximately 70 db. The output of the IF crystal filter is amplified by additional amplifiers 27 to a suitable level for processing by envelope detector 51. The 1020 hertz bandpass filter 157 is used to enhance the morse code identifier for processing.

The microprocessor portion of the incrementing navigation receiver embodying the present invention includes the central processing unit 31 (CPU), clock 83, general purpose input-output device 33, ROM 147, RAM 153 and 155, and a keyboard and display interface 159. Moreover, a compatible display and keyboard enable the pilot to program or load the navigation coordinates, the frequencies of the VOR station and view the display to obtain a visual indication of the programmed information.

The block diagram of the keyboard and display interface is also shown in FIG. 9 with the central processing unit. A ROM (read only memory) 147 containing the 160 VOR frequencies with each associated coordinates in longitude and latitude as well as a morse code identifier, and two RAM (random access memories) 153 and 155 or sometimes called "scratch pads" are addressed by the input/output (I/O) from the central processing unit. The RAM 153 can have written into its memory up to 32 VOR frequencies by binary addressing of the frequencies programmed by the keyboard or selected from a ±2° bracket search as selected by the processor The central processing unit through its I/O ports both control the receiver, the ROM 147, both RAM's 153 and 155 and the VOR bearing display 161. The processor is also controlled by the receiver in that when a signal is received, and computations show that its coordinates are suitable for use in determining the new navigational VOR radial, an output from the receiver AGC circuit via trigger 111 enables a memory entry mode to place the VOR frequency, coordinates and identifier into memory. The central processing unit also decodes the morse code identifier of each VOR station for verification with coordinate and frequency information for that particular VOR. This identifier is a repeated three character audio signal from filter 157 converted to a binary form by Schmitt trigger 163. The processor will dwell on a VOR signal until the identifier has been verified and a quick check of the ROM reveals whether the VOR station is suitable for navigation. When 3 VOR stations are tested upon reception and found suitable, only those 3 will be stored in the RAM and the remainder will be ignored.

The keyboard, display are well known techniques that do not require elaborate discussion at this point. The CPU multiplexes 5 digit driver outputs to activate the 5 digits. The CPU also multiplexes the 7 segments of each display with the 5 digit drivers. The keyboard selects the appropriate digit driver and keyboard return $K_1$-$K_4$ the proper time slot to address the internal ROM of the CPU to perform the desired function, whether it is merely adding digits or doing the computation and generating the navigation radial.

The VOR bearing information is read out in 3 digits giving an accuracy of ±1° which is about the accuracy limit of VOR navigation systems generally. Then as previously mentioned, there are two input signals required to properly operate the digital phase detectors as shown in FIG. 9. The purpose of these circuits is to produce a 3 digit number in multiplexed format which is representative of the phase angle (in degrees) between the two square wave output signals of the analog radial circuits.

A clock circuit 165 and 12 bit counter 167 are utilized to obtain the necessary binary code suitable for 1° accuracy and for multiplexing into a 3 digit display 161. The outputs of the 12 bit counter are fed into a 12 bit latch 169 and strobed by the I/O line 171 of the processor after the computation of the way point bearing is obtained.

In the computation of the way point bearing, the net effect is similar to moving one of the VOR stations to the way point. When the pilot crosses the way point or pseudo VOR station, he will get a normal TO-FROM flag reversal on indicator 173 of FIG. 8 and the normal needle (FIG. 8) wiggle associated with station passage.

One feature not previously discussed in detail is the fact that the area navigation system will also function as a standard VOR receiver. When operated in the MAN mode, one can program the frequency of a VOR station, or several stations, along a planned cross country trip and place them into memory 153 for rapid retrieval during the flight. This is very useful during a long cross country flight. The area navigation system need only function near his destination.

The output of the VOR signal processors which are the 30 hertz reference and 30 hertz variable phase signals are fed into two digital phase detectors 175 and 177. The phase detectors are standard digital counter circuits described earlier. The variable phase signal is coupled into a series of operational amplifiers 179, 181 and 183 to provide a quadrature voltage that is applied to an omni bearing selector potentiometer or OBS pot 185. The output of the OBS potentiometer is a phase angle between 0° and 359° depending upon the pilots selection. A rotatable compass card surrounding the coarse deviation meter is used to select the appropriate radial of the VOR station the pilot chooses to operate from as shown in FIG. 8.

The outputs of the digital phase detectors are coupled into 12 bit latches 169 and 187. The output of the latches are fed into 12 bit digital to analog converters 189 and 191 to provide a D.C. output proportional to the binary value of the input code from the latches. The D/A converters will provide 11 bit accuracy and resolution thus giving accuracies of close to 0.5 degrees. The D.C. analog voltage is coupled into one side of the course deviation meter 193. When the proper radial has been intercepted as selected by the OBS knob 195, the phase angle information from both digital phase detectors will be identical and hence the analog D.C. voltage from the D/A's will be equal thus resulting in a centered course deviation indicator.

A TO-FROM flag 173 display is possible through logic 197 coupled to the reference and variable phases of the 30 hertz VOR signal.

The 3 digit bearing display 161 will continuously read out the actual radial the aircraft is on in addition to the course deviation indicator and OBS potentiometer compass setting. In the present invention, it is felt that the more conventional means of operating from a VOR station should be included to add to the flexibility of the area navigation system. A volume control 199, audio amplifier 55 and speaker circuit are also included in addition to an identifier notch filter 53 when the pilot desires to listen to a weather broadcast on the VOR station.

When functioning in the AUTO mode, the OBS circuit is disabled by the I/O line 171 of the processor since the correct radial is shown in the 3 digit bearing display 161 and the course deviation meter 193 will indicate on course information, the OBS would only serve to confuse the pilot since the best possible and shortest course to the way point has automatically been computed and displayed. The pilot need only to fly "the needle" as indicated by the area navigational system.

Annunciator lights 201, 203 and 205 are included to respectively show "AUTO", "MAN", "MEMORY FULL". Thus the pilot can instantly check the mode of operation without accidentally disturbing the keyboard and producing an unwanted error. Frequency and coordinate lights 207 and 209 respectively indicate the mode that the 5 digit display is operating in.

Additional annunciator lights may be provided on the area navigation receiver to indicate to or from a VOR radial and a switch 211 is provided for switching the 3 digit bearing display TO or FROM.

The remote mounted area navigation/VOR display as shown in FIG. 8 features TO-FROM flags 173 as well as an area navigation flag 213 to indicate automatic area navigation operation.

Central processing unit 31, clock 83, memory 37 and the input/output buffers, such as 33 and 45, may for example be logic chips available from Rockwell International Corp., with the central processing unit being their type PPS-4. This unit is described in detail, for example, in the Oct. 11, 1977 issue of Electronic Design. Other components are generally conventional and available from a wide variety of commercial suppliers.

From the foregoing, it is now apparent that a novel radio navigation device having area navigation capability and having VOR scanning capability has been disclosed meeting the objects and advantageous features set out hereinbefore as well as others and that numerous modifications will suggest themselves to those of ordinary skill in the art and accordingly the scope of the present invention is to be measured only by that of the appended claims.

What is claimed is:

1. A radio navigation device comprising:
    a plurality of display units for continuously providing simultaneous visible bearing indications relative to a plurality of geographically separated radio navigation facilities;
    a single radio frequency receiver selectively operable at each of a plurality of different receiving frequencies corresponding to different radio navigation facilities; and
    means for repetitively sequencing the receiver between different receiving frequencies at a rate sufficient to maintain a substantially continuously updated display for each bearing indication.

2. The radio navigation device of claim 1 wherein the means for repetitively sequencing includes means for storing a plurality of digital indications corresponding to the different receiving frequencies, and the receiver includes means utilizing the digital indications to sequentially tune the receiver to receive navigation signals from the corresponding different radio navigation facilities.

3. The radio navigation device of claim 2 wherein the digital indication utilizing means includes a frequency synthesizer having a programmable divider and a voltage controlled oscillator within a phase locked loop.

4. The radio navigation device of claim 1 further comprising means for storing a digital indication of a preselected bearing from and the frequency of a specified radio navigation facility, and means for periodically comparing bearing information received from the specified facility with the stored indication and providing an output indication when the compared indications are equal.

5. The radio navigation device of claim 4 wherein the means for storing is adapted to store a plurality of preselected bearing indications and associated facility frequencies and further comprising logic means for providing an output indication when stored and received bearings for at least two distinct facilities both have equal compared indications.

6. The radio navigation device of claim 1 including a manual input keyboard and a keyboard entry display enabling an operator to confirm entry of desired data, the keyboard including operator actuable means for categorizing entered data as one of bearing information and facility frequency information.

7. The radio navigation device of claim 1 wherein the means for repetitively sequencing includes means for storing a plurality of receiving frequency identifiers, means for sequentially utilizing the identifiers to tune the receiver to the associated frequency, the identifiers normally being automatically repetitively utilized, and manual override means for manually tuning the receiver to each successive stored frequency.

8. The radio navigation device of claim 7 including means effective upon actuation of the manual override means for allowing operator entry of selected receiving frequency identifiers into the means for storing.

9. A radio navigation device comprising:
    a single ratio frequency receiver selectively operable at each of a plurality of different receiving frequencies corresponding to different geographically separated omnirange radio navigation facilities;
    means for repetitively sequencing the receiver between different receiving frequencies; and means for processing received bearing information from each of a number of different geographically separated omnirange navigation facilities to provide navigational data from more than one facility from the single receiver.

10. The radio navigation device of claim 9 including manually operable keyboard means for supplying both frequency identifying information and navigational parameters to the means for processing.

11. The radio navigational device of claim 9 wherein the means for sequencing provides a basic dwell period for the receiver on each selected receiving frequency with the receiver remaining tuned to that selected frequency for a further predetermined time interval only if a navigational signal is present.

12. The radio navigation device of claim 9 including first display means for providing an indication of the frequency to which the receiver is tuned and second display means for displaying navigational data derived from the received signal.

13. The radio navigation device of claim 12 further comprising operator actuable input means for temporarily converting the first display means to indicate navigational information introduced into the input means by an operator.

14. The radio navigation device of claim 13 wherein the introduced information specifies a geographical location distinct from any of the facilities receivable by the receiver, the second display means providing bearing information relative to the distinct geographical location.

15. The radio navigation device of claim 9 wherein the means for processing includes means for averaging information from each navigation facility over a number of consecutive time intervals.

16. The radio navigation device of claim 15 further including means for testing and selectively translating the information to be averaged to avoid averaging the information across a substantial discontinuity.

17. A passive airborne radio navigation device including:
means for receiving radio navigation signals from a plurality of geographically separated navigation installations;
processor means for combining navigation information from distinct navigation facilities; and
means responsive to the processor means for displaying an indication of the airborne device location in relation to a geographical location distinct from any of the navigation facilities being received.

18. The passive navigation device of claim 17 wherein the processor means calculates the distance between the airborne device location and the distinct geographical location.

19. The passive navigation device of claim 17 wherein the means for displaying provides a bearing indication of the airborne device location from the distinct geographical location.

20. The passive navigation device of claim 17 wherein the processor means compares received bearing information from each navigation facility with predetermined bearing information and enables the means for displaying when coincidence between a navigation facility bearing and an associated predetermined bearing occurs.

21. The passive navigation device of claim 20 including further processor responsive display means and means for enabling the further display means only when at least two navigation facility bearings coincide with their associated predetermined bearings.

22. The passive navigation device of claim 17 including means for storing information pertaining to a plurality of navigation installations including frequency identifying data; means for interrogating the stored information and for identifying certain of the navigation facilities as being useful for a particular navigational situation.

23. The passive navigation device of claim 22 including temporary storage means and means for transferring identified facility information to the temporary storage means for quick access by the processor means.

24. The passive navigation device of claim 23 wherein the transferred facility information includes facility latitude and longitude, a not necessarily unique identification of the facility transmitting frequency, and a facility identifier code unique to the particular facility.

25. The passive navigation device of claim 22 wherein the means for interrogating and for identifying compares operator entered longitude and latitude information with the corresponding stored information and identifies as useful each facility having both latitude and longitude within predetermined limits of the operator entered information.

26. The passive navigation device of claim 17 further comprising means for storing receive frequency determining information, the processor means adapted to select certain of the frequency determining information and to supply that selected information to the means for receiving to tune the receiving means to a desired navigation installation.

27. The passive navigation device of claim 26 wherein the processor means includes means for testing the frequency determining information to determine if a usable navigation signal determined thereby can be received.

28. The passive navigation device of claim 26 wherein the processor means includes means for comparing geographical data associated with the stored information with operator determinable geographical data to select only the certain information of installations within specified geographical limits.

29. A passive airborne radio navigation device including:
means for receiving radio navigation signals from a plurality of geographically separated omnirange navigation installations;
processor means for combining navigation information from distinct navigation facilities; and
means responsive to the processor means for providing an indication of the airborne device location in relation to a geographical location distinct from any of the navigation facilities being received.

30. The passive navigation device of claim 29 wherein the processor means compares received bearing information from each navigation facility with predetermined bearing information and enables the indicating means when coincidence between a navigation facility bearing and an associated predetermined bearing occurs.

31. The passive navigation device of claim 30 including further processor responsive means for indicating, and means for enabling the further indicating means only when at least two navigation facility bearings coincide with their associated predetermined bearings.

* * * * *